United States Patent [19]

Keller et al.

[11] Patent Number: 5,648,441

[45] Date of Patent: Jul. 15, 1997

[54] SUBSTRATE AND POLYMERIZABLE MIXTURE, METHOD OF MANUFACTURING OF SAID POLYMERIZABLE MIXTURE, AND METHOD OF MANUFACTURING OF A NON FOGGING OR LOW FOGGING LAYER

[75] Inventors: Martin Keller, Gersau; Martin Lenhard, Ittigen, both of Switzerland

[73] Assignee: Gurit-Worbla AG, Ittigen, Switzerland

[21] Appl. No.: 669,126

[22] Filed: Jun. 24, 1996

Related U.S. Application Data

[63] Continuation of Ser. No. 432,760, May 2, 1995, abandoned, which is a continuation of Ser. No. 166,075, Dec. 14, 1993, abandoned.

[30] Foreign Application Priority Data

Dec. 23, 1992 [CH] Switzerland ............... 3917/92

[51] Int. Cl.$^6$ ................... C08F 30/04
[52] U.S. Cl. ................... 526/240; 525/330.2
[58] Field of Search ............ 526/240; 525/330.2

[56] References Cited

U.S. PATENT DOCUMENTS

| | | |
|---|---|---|
| 3,872,063 | 3/1975 | Kim . |
| 4,058,508 | 11/1977 | Naarmann et al. ............... 526/240 |
| 4,484,204 | 11/1984 | Yamamoto et al. . |
| 4,760,011 | 7/1988 | Kakimi . |
| 4,842,977 | 6/1989 | Kakimi . |
| 4,891,295 | 1/1990 | Kakimi . |
| 5,102,936 | 4/1992 | Huth et al. ............... 526/240 |

FOREIGN PATENT DOCUMENTS

| | | | |
|---|---|---|---|
| 59-81319 | 5/1984 | Japan ............... | 526/240 |
| 7602864 | 9/1977 | Netherlands ............... | 526/240 |
| 783905 | 10/1957 | United Kingdom ............... | 526/240 |

OTHER PUBLICATIONS

JP 63218246—1988 p. 34 abstract.
JP 60076735—1985 "Agency of Ind-Sci. & Technology" pp. 48 and 49 abstract.
1046 TMOG 2 Official Gazette Sep. 4, 1984.

Primary Examiner—Joseph L. Schofer
Assistant Examiner—N. Sarofim
Attorney, Agent, or Firm—Shoemaker and Mattare, Ltd.

[57] ABSTRACT

A polymerizable mixture containing acrylic acid or a partially cross-linked oligomer acrylate is used for the manufacture of a non fogging or low fogging layer on a substrate. The polymerizable mixture contains 1 to 10% W of a salt, in particular a salt of acrylic acid, as well as any necessary further additives.

4 Claims, No Drawings

SUBSTRATE AND POLYMERIZABLE MIXTURE, METHOD OF MANUFACTURING OF SAID POLYMERIZABLE MIXTURE, AND METHOD OF MANUFACTURING OF A NON FOGGING OR LOW FOGGING LAYER

This application is a Continuation of application Ser. No. 08/166,075, filed Dec. 14, 1993, abandoned, which is a continuation of application Ser. No. 08/432,760, filed May 02, 1995, abandoned.

The invention concerns a polymerizable mixture, a method of manufacturing a polymerizable mixture and the use of a polymerizable acrylic acid, as well as a method of manufacturing a non fogging or low fogging layer according to the preamble of the independent patent claims.

Polymerizable mixtures or solutions for the manufacture of a non fogging or low fogging layer are known in the most varied of forms. Areas of application are mainly spectacles, gas masks, glasses, mirrors and other optical glass products. In practice, such layers can be made, for example, from cellulose ester, soap or also simply from cellophane foil. Disadvantages of known coatings are mainly insufficient absorption of water, optical quality, scratch resistance and thus freedom from fogging.

Mainly in the case of plastics with hard/non polar surfaces, such as, for example, polycarbonates, which are particularly suitable for optical applications, coating with these types of non fogging layers is extremely desirable since the said hard plastics possess no water absorption and, with that, possess no freedom from fogging in moist atmospheres.

The invention has the purpose of improving the mixtures and methods as mentioned in the introduction in such a way that polymerizable layers, which excel with regard to high freedom from fogging and good surface properties, can also be applied onto substrates with problematic adherence, such as, for example, polycarbonate.

According to the invention, this task is primarily fulfilled according to the characteristics of the patent claims.

Through the use of polymerizable acrylic acid or a polymerizable oligomer acrylate, to which 1 to 10% (W) of a salt, in particular an alkali salt, especially a salt of acrylic acid (related to the acrylic acid respectively the acrylate) is added, a non fogging layer with good properties can be manufactured in a simple way. The known polymerizing catalysts can be put to use. Here, for example Irgacure, Quantacure, Darocure, Benzophenone etc are included. Polymerisation itself can be initiated in a known way by means of light at various frequencies (UV radiation, ABC range). Electron radiation can also be used as a polymerization initiator.

Particularly good adherence with the substrate and long term freedom from fogging can be attained if the mixture contains 10% W to 70% W acrylic acid and 20% W to 90% W mannitol diacrylate.

With that, mannitol diacrylate can be produced in a known way in that first of all mannitol is transformed with sodium methylate to disodic mannitate. Through the addition of acrylic acid chloride, mannitol diacrylate and sodium chloride are obtained, which can be separated by means of ion exchange.

According to the invention, it has been demonstrated that mannitol diacrylate can be produced considerably more simply if acrylic acid is mixed with mannitol. The mannitol is dissolved in excess acrylic acid. Then hydroquinone is added, and the mixture is treated at 150 degrees C. for a duration of 12 hours in reflux.

Through the mixing of acrylic acid (⅔) with a polymerization initiator (proportion by weight 0.8%) and with mannitol diacrylate (⅓), an excellent coating mixture can be produced. Through the inclusion of additives, such as for example isobornyl acrylate (proportion by weight 1:2), the layer of material can be prevented from becoming brittle.

Through the addition of a UV-catalyst, the duration of polymerization and the wavelengths of the UV radiation causing polymerization can be determined in a known way. A layer manufactured in this way is defined by good absorption of water and high resistance to scratching. The thickness of the layer will determine the degree of water absorption.

At the same time, the addition of mannitol will ensure that the capability of the acrylic acid to absorb water remains intact during cross-linking.

The invention can also be realised particularly effectively if an oligomer acrylate, in particular therefore a polyurethane acrylate or a polyester acrylate, is dissolved in acrylic acid, free of water, and then if an alkali salt, in particular a sodium salt or a lithium salt, is added. Instead of lithium or sodium, other salts, for example potassium and cesium (Cs) salts are also suitable. Naturally, further metallic salts of acrylic acid are able to be used.

The lithium salt is best manufactured immediately prior to adding, for example from acrylic acid and lithium methylate. The amount of oligomer acrylate can, with that, amount to 5% to 70% (in relation to total weight). The proportion of salt can be 0.5% to 60% (in relation to total weight).

Practically, the salt is manufactured prior to adding. This can be manufactured, for example, from sodium methylate (30% in methanol) and acrylic acid. The proportions of the oligomer acrylate can have amount to between 10 and 60% (in relation to total weight). The salt can be added at an amount of 1 to 10% (related to total weight).

If salt is directly formed through the mixing of sodium ethylate in methanol, the solvent can be evaporated off during or after mixing or also before/during use. When using sodium ethylate in a mixture of, for example, 30% in methanol, the methanol must therefore be evaporated off after mixing and/or agitation.

The normal additives, for example Irgacure 184 or 500 from Ciba Geigy, can then still be introduced into the mixture (UV-catalysts).

As an Acrylate, an aliphatic urethane acrylate has particularly proven itself.

Layers with particularly good adherence, with good water absorption capability and a particulary scratch resistant surface, will result if the polymerizable mixture is both applied to the body to be coated and cured under the exclusion of air. In this way, no protective materials must be added to the mixture to prevent cessation of polymerization through the influence of $O_2$.

The use of oligomer acrylates mainly ensures that the applied layer is reliably water insoluble, and that it will be extremely scratch resistant for a wide area of application, and will not be brittle.

In particular cases of application it is also possible to apply the partially salted acrylic acid in a first working step, to complete polymerization of the first layer and then to apply a second layer of mannitol diacrylate. In practice, the application of a single layer is undertaken, mostly for reasons of economy.

The following examples of execution serve to explain the invention.

EXAMPLE 1

Manufacture of a mannitol diacrylate mixture:

9.1 g mannitol (D(-)-Mannitol, Merck, for determination of boric acid) is mixed to an emulsion in 120 ml methanol (Merck, dried for analysis purposes) in a round flask, and is subsequently dissolved through boiling in reflux. 18 g of sodium ethylate is then slowly added (Merck, 30% in methanol) and boiled in reflux for one hour. A felt of long needles is formed. Methanol is then evaporated off in a vacuum and the mixture is mixed to an emulsion four times in n-hexane and once again the solvent is removed and the mixture is dried in a desiccator. 11.5 g of a light yellow crystaline substance is obtained. This is mixed to an emulsion in 120 ml n-hexane in a 250 ml round flask and maintained at 17 degrees C. Under heavy agitation, 9.1 g acryloyl chloride is slowly added (Merck, stabilised for synthesis). After 5 hours of agitation and 10 hours standing, 0.1 g of hydroquinone is added and the mixture is dried in a vacuum. 21.3 g of a mannitol diacrylate and common salt mixture is formed. The mixture is dissolved in 200 ml deionised water and subsequently, by means of an ion exchanger, (Amberlite IR 120, acidic) separated from the common salt. 0.1 g hydroquinone is introduced into the eluate, the water is removed and drying in a desiccator is then undertaken. 15.3 g of a light yellow substance remains. This is completely soluble in water or in acrylic acid. It is hard to dissolve in acetone, methanol, ethanol or ethyl acetate.

5 g of the substance is dissolved in 5 g acrylic acid. 0.10 g of Irgacure 184 is dissolved in, as an initiator. Against quarz, on a polycarbonate plate (Lexan 8040) and cured by UV, a layer is obtained which, per micron of layer thickness, results in a time without fogging of approximately 5 sec (measured according to DIN 4646.8)

EXAMPLE 2a

Manufacture of a mannitol diacrylate mixture:

27.3 g of mannitol are mixed to an emulsion in a 250 ml round flask in 70.5 g acrylic acid, and 0.1 g of hydroquinone is dissolved in the emulsion. The entire amount is boiled at 165 degrees C. bath temperature in reflux. The mixture initially becomes firm, but then will clear. After four hours the process is interrupted and the water which has formed is distilled off. This procedure is repeated twice. A clear, viscose solution is formed of mannitol mono- to triacrylate in acrylic acid.

0.1 g Irgacure 184 is dissolved in 10 g of the solution. Against quarz, on a polycarbonate plate, a non fogging layer will be formed, the time without fogging of which amounts to approximately 5 seconds per micron layer thickness.

EXAMPLE 2b

Manufacture of a lithium acrylate mixture:

2.0 g lithium ethylate is carefully dissolved in 48 g of acrylic acid (Protective and safety measures as normal). Into this, 1.5 g Irgacure 184 or an adequate UV-catalyst is now dissolved. To this, 48 g of a urethane acrylate oligomer is mixed. (for example Ebecryl 270 from Radcure).

Against quarz on polycarbonate, cured by UV, this mixture results in a non fogging layer with a time without fogging of more than 10 seconds per micron of layer thickness.

EXAMPLE 3

Manufacture of a mixture with urethane acrylate:

100 g of an aliphatic urethane acrylate oligomer (ebecryl 270 from Radcure) is dissolved in 200 ml of acrylic acid. 20 g of sodium methylate is slowly and carefully mixed into this. In total, 3.2 g Irgacure 184, or another UV-catalyst, is dissolved. The quantity is to be adjusted according to the particular product used.

Against quarz, on polycarbonate, cured with UV, this results in a non fogging layer with a time without fogging of approximately 10 seconds per micron layer thickness.

EXAMPLE 4

Manufacture of a mixture with PE-Acrylate:

100 g of a polyester acrylate (Ebercryl 505 from Radcure) is prepared in the same way as detailed in example 3.

Cured in the same way, the resultant coating gives a time without fogging of approximately 5 seconds per micron layer thickness.

EXAMPLE 5

The mixtures manufactured according to the preceding formulations are applied to a polycarbonate foil (Lexan 8040 from GE), size DIN A4, thickness 0.5 cm. The polycarbonate foil is pressed onto a quarz plate in such a way that a polymerizable mixture layer thickness of approximately 20 μm results. Then the quarz plate is subjected to illumination from a UV lamp for 30 seconds. After removal of the quarz plate, the following values will result:

EXPERIMENT 1

| Example | 1 | 2a | 2b | 3 | 4 |
| --- | --- | --- | --- | --- | --- |
| Scratch resistance: | | | | | |
| Test for resistance to surface damage by fine particles (Sandrieseltest/ Falling Sand Test- Apparatus according to DIN 4646 Δ Haze) | 20% | 17% | <1% | 7% | 10% |
| Gitterschnitthaftung/ Test with Scotch Tape: | 3 | 3 | 10 | 10 | 8 |
| Reisstest/ Tearing test: | 0 | 0 | 8 | 10 | 5 |
| Time without fogging: | | | | | |
| (Sec./um layer thickness DIN 4646.8) | 5 | 5 | >10 | 10 | 5 |

EXPERIMENT 2

First of all a mixture of 10 g acrylic acid, 1.2 g sodium ethylate (30% in methanol) as well as 0.11 g of catalyst are thinly applied to a polycarbonate foil. Curing ensues by means of UV radiation in the same way as experiment 1. After removal of the quarz plates, a second layer of mannitol diacrylate is applied, according to example 2a, with a layer thickness of 10–20 μm and is pressed between the quarz plates for a second time and subjected to curing. Other substrates, such as CR39, PMMA, polyester etc, are likewise able to be employed.

For the non fogging layer so created, the following values will result:

| Example | 1 | 2a | 3 |
| --- | --- | --- | --- |
| Layer thickness: | 10 | 15 | 20 |
| Scratch resistance: | | | |
| Test for resistance to surface damage by fine particles (Sandrieseltest/ Falling Sand Test-Apparatus according to DIN 4646 Δ Haze) | 17% | 16% | 16% |
| Gitterschnitthaftung/ Test with Scotch Tape: | 10 | 10 | 10 |
| Time without fogging: | | | |
| (Sec./um layer thickness DIN 4646.8): | 51 | 80 | 105 |

Naturally, curing can also be carried out under an inert gas shield. Alternatively, substances for protection of the polymerization procedure from oxygen can be employed, as is normal in this branch.

For quantity manufacture the employment of a coating machine would be recommended, through which the foil which is to be coated would be guided, the polymerizable mixture being introduced, under exclusion of air, between a feed strip or roll and the foil. Illumination of the mixture can be carried out not only through the foil, but also, for example in the case of a quarz drum, through the drum.

Inasmuch as the invention is subject to modifications and variations, the foregoing description and accompanying drawings should not be regarded as limiting the invention, which is defined by the following claims and various combinations thereof.

We claim:

1. A polymerizable mixture for application to the outer surface of a substrate to produce upon polymerization a non-fogging or low fogging layer on said substrate from said polymerizable mixture, said mixture consisting essentially of:

(1) acrylic acid;
   (2) an aromatic or aliphatic polyurethane acrylate or polyester acrylate in an amount of 10 to 60 weight percent of the acrylic acid;
   (3) an alkali metal salt of acrylic acid in an amount of 1 to 10 percent by weight based on the acrylic acid; and
   (4) a polymerization catalyst.

2. Polymerizable mixture according to claim 1, wherein the salt of acrylic acid is the sodium salt.

3. Polymerizable mixture according to claim 1, wherein the salt of acrylic acid is the lithium salt.

4. Polymerizable mixture according to claim 1, containing 10 to 60 weight percent isobornyl acrylate.

* * * * *